Patented June 28, 1927.

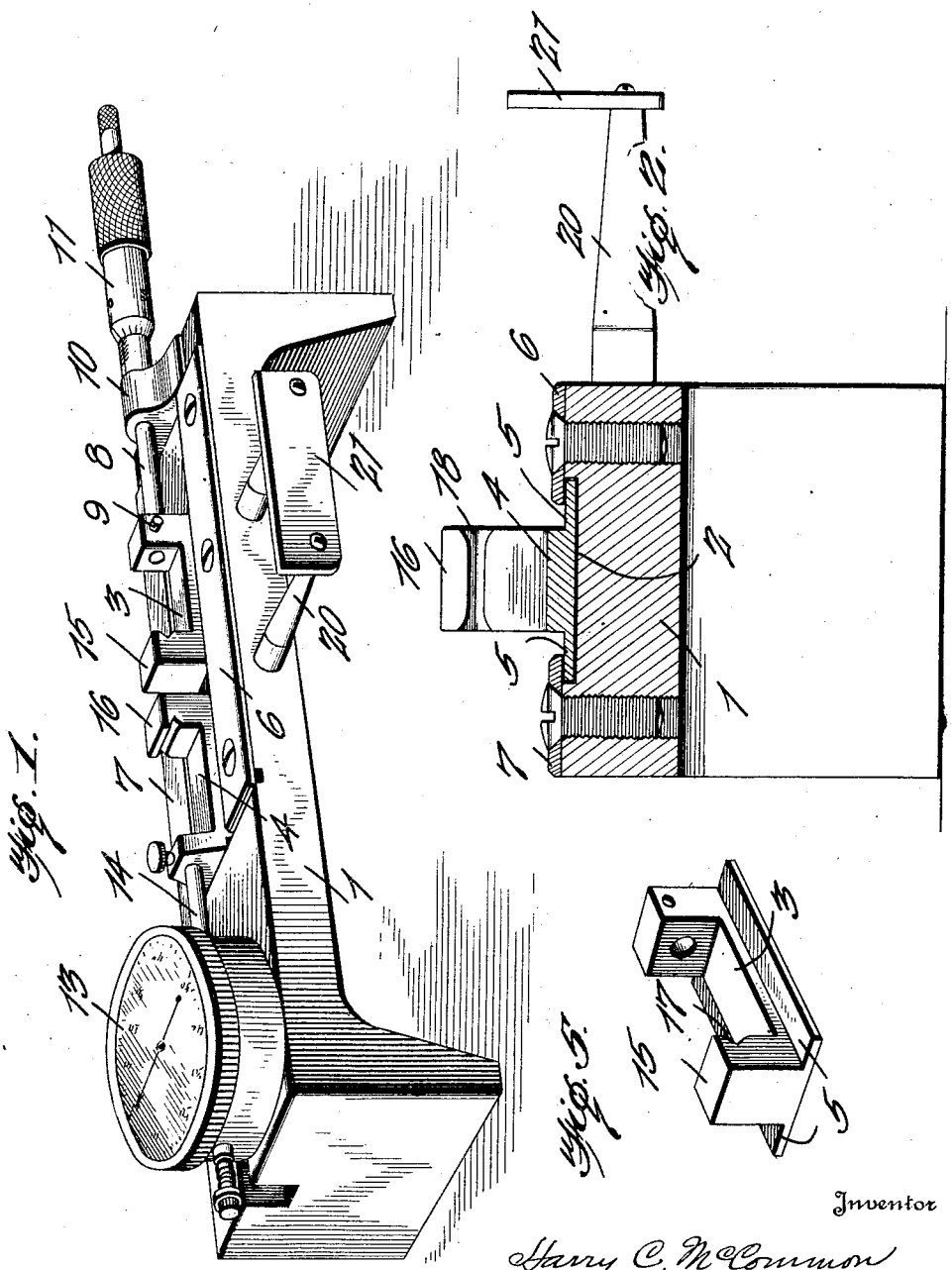

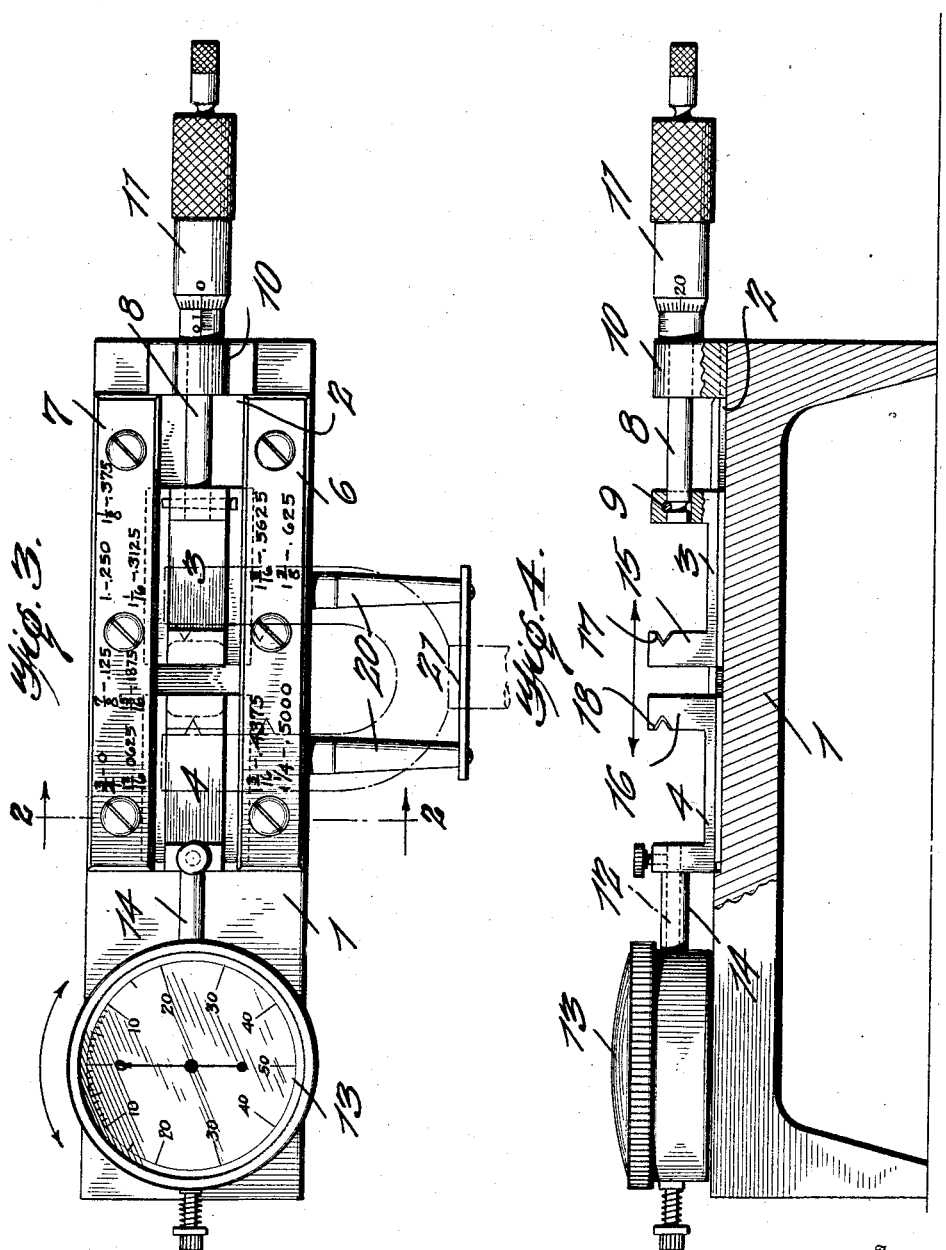

1,634,156

UNITED STATES PATENT OFFICE.

HARRY C. McCOMMON, OF ALTOONA, PENNSYLVANIA.

MEASURING INSTRUMENT.

Application filed July 3, 1926. Serial No. 120,419.

This invention relates to improvements in a device for making accurate and precise measurements; and has for its principal object to provide convenient means for checking or testing for accuracy, gauges that are used in the various operations of making machined parts, which latter are required to be finished with very precise dimensions. Thus, for example, in the making of certain kinds of stay-bolts for boilers, the threaded ends of such bolts must be finished to test within a few one-thousandths of an inch of specification dimensions. To gauge or test the dimensions of such work, the operator commonly uses a so-called maximum and minimum limit gauge provided with two sets of spaced gauge points which are set to give the "over" and "under" permissible variation from specification dimension. In finishing the thread, such a gauge is repeatedly used until the work is completed, or when in applying the gauge, the work will just pass one pair of points and will not pass the other pair.

While gauges of this kind are of rugged construction to withstand hard usage, it is necessary, in order to secure uniform accuracy in the finished product, that the gauges be frequently tested and compared; and for this work the practice heretofore has been to furnish a set, or sets, of accurately machined standard size parts for all the different work of the machine shop. Such standards are expensive to make, requiring the highest grade of skilled workmanship, and moreover they have only a short useful life, when they must be discarded as worn out.

My invention seeks to replace these various sets of standards by a single measuring device which can be set, by micrometer adjustment, to any one of a comparatively large number of standard dimensions, and in which the element of wear, as understood in the tool making art, is practically eliminated; so that a substantial saving in the costs of manufacturing operations of machine work is made possible, and this by the use of a small, easily handled and portable device which requires no unusual skill to set or operate and which, nevertheless, insures the desired accuracy to an improved degree over known methods or devices of the prior art. The device is capable of use in testing gauges of various kinds, and description of its use for testing thread limit gauges is simply by way of convenient example.

The details of construction of my improved device will be described in connection with the accompanying drawings, forming a part of this specification, and in which:

Fig. 1 is a perspective view of the measuring device;

Fig. 2 is a sectional view on the line 2—2 of Fig. 3;

Fig. 3 is a plan view;

Fig. 4 is a side elevation partly in section, and

Fig. 5 is a detail, in perspective, of one sliding anvil element which is adjusted by the micrometer screw at the right hand side of the device.

In the drawings, the measuring and testing devices are mounted on a supporting table 1, which may conveniently comprise a short length of commercial steel of channel section. The upper surface of the support is machined to form a rather wide, flat, channel or groove, shown at 2, in Fig. 2, which groove extends longitudinally of the support from the end, at the right, to a point beyond the center toward the left. This groove forms a guide for the longitudinal movements of the anvil elements 3 and 4. Each anvil comprises a main U-shape portion with a base having laterally extending flanges 5, which flanges are dimensioned to lie within the groove 2 of the support 1. The depth of the groove 2 is such that the upper surfaces of the lateral flanges of the anvils will be substantially flush with the upper surface of the supporting table 1. Plates 6 and 7, bolted to the upper surface of table 1, parallel the groove 2 on opposite sides, and have their inner edges projecting partly over the groove (see Fig. 2) to retain the base flanges of the anvils therein and thereby limit the anvils to rectilineal movement.

The right anvil 3, is connected at its outer end to a micrometer adjusting screw, the outer projecting end of which is shown at 8. This screw is connected with the anvil as by a pin 9, to permit rotation of the screw and to produce translation of the anvil with adjustments of the screw. The screw 8 has a bearing of substantial width in a block 10, secured to the support 1, and closing the outer end of the groove 2. The inner face of the block 10, forms a stop to limit the outward movement of the anvil 3. The adjustment of the anvil 3 by the micrometer screw 8, is effected by manipulation of the micrometer gauge 11, which is of conventional design.

The left anvil 4, is connected at its inner end to the projecting stem 12, of a torsional indicating gauge 13, which latter is rigidly secured in any convenient manner to the upper surface of the support 1. The indicating gauge 13, which is also of standard and known construction, is preferably selected as one, the calibration of which corresponds to that of the micrometer gauge at the opposite end of the device. The connection between the anvil 4, and the gauge 13 is rigid and such that movement of the anvil will produce a corresponding deflection of the indicating pointer on the dial of the gauge. The dial is adjustable and the zero point may, therefore, be set at any time, to coincide with the position of the pointer. In the position of the anvil 4, as shown in Figs. 3 and 4, it occupies its normal or zero position, abutting the end of the fixed sleeve 14, which projects from the casing of the gauge 13. Movement of the anvil 4, to the right will, therefore, be measured, in some suitable unit, by the deflection of the pointer of gauge 13.

The inner ends of both of the anvils 3 and 4 are provided with upright lugs 15 and 16, respectively, which provide the gauge surfaces. The surface of each of these lugs facing opposite ends of the device are appropriately treated to constitute the gauge surfaces and for thread gauges they are notched or grooved as at 17 and 18. The manner of use of the device, e. g. in testing a maximum and minimum limit thread gauge is indicated in dotted lines in Fig. 3.

From the foregoing description of the elements and construction features of the device, it will be seen that the anvils 3 and 4 are each capable of rectilineal movement, within certain limits, the anvil 3 being adjustable with respect to the anvil 4 by means of a micrometer screw gauge, and the anvil 4 may be moved against the torsion of the spring gauge 13 toward the anvil 3.

A rest or support for the gauge to be tested is provided at the front side of the table 1, and comprises two horizontal legs 20, connected at their outer ends by a plate 21. The upper edge of the latter plate constitutes the rest for the handle of the gauge, as will be seen in the dotted line illustration of Fig. 3.

The testing device may be calibrated, if desired, and indicia of such calibration may be cut or die-stamped in the metal of the plates 6 and 7. Such calibration is illustrated in Fig. 3.

The operation and use of the device of the present invention will now be described. Assuming it is desired to test a maximum and minimum limit thread gauge for a ¾ inch thread, and that the limit gauge has been set for the permissible "over" and "under" variation from this dimension—the testing device is first set by adjustment of the micrometer gauge 11, in accordance with calibration indicia. A master gauge of this dimension is then applied to the testing device, and if the initial setting is precisely accurate, the points of the master thread gauge will just pass the grooves in the anvils without deflecting the pointer of the indicating dial guage 13. Preferably, however, there should be a deflection indication on the latter gauge, and with the master gauge in position, the dial of the gauge 13, is rotated until its zero mark coincides with the deflected pointer. This adjusted zero position of the dial having been determined, the testing device is then properly set to test any number of ¾ inch gauges, which for testing are placed with their opposing gauge points contacting with the grooves 17 and 18 of the anvils. The amount of deflection of the pointer of the indicating gauge 13 from the adjusted zero position will give a visual indication of the accuracy of setting of the gauge to be tested.

In the actual test then of a maximum and minimum limit thread gauge, the maximum gauge points when placed in testing position, will permit a deflection of the pointer of the dial gauge to one side of the zero on the adjusted dial; and the minimum points will produce a pointer deflection to the opposite side of the adjusted zero. The amount of the deflection in each instance is a measure of the variance of the sets of gauge points from the specified dimension, and by calibrating the gauge 13, for thousandths of one inch, the tester will be able to read directly in this unit, the limits at which the gauge being tested is set. The particular unit of calibration, however, is not material, but it is most convenient that the unit of measure of the two gauges 11 and 13, be the same.

It will be apparent that gauges other than thread gauges may be tested with the device of my invention, and if caliper, or snap gauges, are to be tested, the flat surfaces of the lugs 15 and 16 below the grooves 17 and 18 are used as the gauge surfaces.

What I claim is:—

1. In a measuring instrument for testing the setting of gauges, comprising two independently movable elements presenting projecting gauging surfaces for convenient application of the gauge to be tested, micrometer means for adjusting one of these elements in definite spaced relation to the other one, so that the gauging surfaces of the two elements will be separated by a distance equal to a given desired dimension, and an indicating gauge having its operating stem rigidly fastened to the other element to give a measured indication of its movement relative to the adjusted position of the first named element.

2. In a measuring instrument for testing the setting of gauges comprising a support upon which are slidably mounted two independently movable elements constructed with cooperating gauge testing projections having gauging surfaces on non-adjacent sides, one of said elements being adjustable relative to the other, and micrometer means for effecting and measuring such adjustment to space the gauging surfaces by a distance equal to a given dimension, the second of said elements being normally positioned against a stop at one side but supported for movement away from the stop and toward the other element, a dial gauge operatively connected with the second element and serving to indicate and measure the amount of movement of the second element in either direction from a predetermined position relative to the first element.

3. In a device for accurate testing of the setting of gauges, comprising a supporting table for measuring devices and also for the gauge to be tested, two independently movable elements with vertically disposed projections having cooperating gauging surfaces which elements are mounted upon the said support for rectilineal movement thereon, a micrometer adjusting means for setting one of the elements so that the gauging surfaces of the two elements may be separated a distance equal to the standard dimension of the particular gauge to be tested, and an indicating gauge connected with the second element which latter gauge is provided with an adjustable dial whereby any position of the second element relative to the first element may be indicated on the gauge as of zero deflection.

4. In a device for accurate testing of the setting of gauges comprising a supporting table for cooperating measuring devices and also for the gauge to be tested, the upper surface of the support being provided with a longitudinally extending groove, two independently movable elements each with a flange which extends into said groove whereby the elements are guided and limited to rectilineal movement on the support, vertically disposed projections forming a part of each of the movable elements with gauging surfaces to which are applied the jaws of a gauge to be tested, a micrometer screw gauge mounted on the support at one end and connected with one of the movable elements to adjust its position in steps of a chosen unit of measure, and an indicating gauge mounted on the support at the opposite end and connected with the second movable element to indicate and measure, in the same unit of measure, the movements of the second element relative to the first element produced in the gauge testing operation.

5. In a device for accurate testing of the setting of gauges comprising a supporting table for two cooperating gauge devices and also for the gauge to be tested, the upper surface of the support being provided with a longitudinally extending groove, a gauge fixed to the support at each of the opposite ends thereof, and two independently movable elements each with a flange which extends into said groove whereby the elements are guided and limited to rectilineal movement intermediate the gauges at opposite ends of the support, vertically disposed projections on the adjacent ends of the movable elements with gauging grooves and surfaces on their nonadjacent sides, a micrometer screw gauge at one end of the supporting table and connected with one of the movable elements to adjust its position in steps of a chosen unit of measure, and an indicating gauge at the opposite end of the supporting table and connected with the second movable element to indicate and measure, in the same unit of measure, any movement of the second element relative to the first element in the gauge testing operation.

6. An article of manufacture comprising an element of a gauge testing device, a base portion including a flange by which the movement of the element is guided, an upstanding lug or projection at one end of the element, the inner face of which has a plane portion and a grooved portion to constitute gauging surfaces, and an upstanding lug at the opposite end by means of which the element may be conveniently connected to a gauge.

HARRY C. McCOMMON.